United States Patent
Nagasawa et al.

(10) Patent No.: US 9,145,161 B2
(45) Date of Patent: Sep. 29, 2015

(54) OUTER COLUMN FOR TELESCOPIC STEERING APPARATUS

(71) Applicant: NSK Ltd., Tokyo (JP)

(72) Inventors: Makoto Nagasawa, Maebashi (JP); Suguru Sugishita, Maebashi (JP); Takahiro Maniwa, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/404,610

(22) PCT Filed: Apr. 2, 2014

(86) PCT No.: PCT/JP2014/059753
§ 371 (c)(1),
(2) Date: Nov. 28, 2014

(87) PCT Pub. No.: WO2014/163113
PCT Pub. Date: Oct. 9, 2014

(65) Prior Publication Data
US 2015/0107399 A1    Apr. 23, 2015

(30) Foreign Application Priority Data

Apr. 3, 2013  (JP) ................. 2013-077791
Apr. 10, 2013 (JP) ................. 2013-082164
Nov. 28, 2013 (JP) ................. 2013-245588

(51) Int. Cl.
*B62D 1/02*     (2006.01)
*B62D 1/185*    (2006.01)
(Continued)

(52) U.S. Cl.
CPC ............. *B62D 1/185* (2013.01); *B22D 19/045* (2013.01); *B22D 19/16* (2013.01); *B60R 25/021* (2013.01); *B60R 25/02105* (2013.01); *B62D 1/184* (2013.01); *B22D 17/00* (2013.01)

(58) Field of Classification Search
CPC ...... B62D 1/185; B22D 19/045; B22D 19/16; B60R 25/02105
USPC ........................................... 74/493
See application file for complete search history.

(56) References Cited

U.S. PATENT DOCUMENTS 8,967,017 B2 *   3/2015  Osawa et al. ............ 74/495
2003/0227163 A1 * 12/2003 Murakami et al. ......... 280/777
(Continued)

FOREIGN PATENT DOCUMENTS

JP  2007-223383 A   9/2007
JP  2008-265646 A   11/2008
(Continued)

*Primary Examiner* — Faye M Fleming
(74) *Attorney, Agent, or Firm* — Miles & Stockbridge P.C.

(57) ABSTRACT

Construction of an outer column for a telescopic steering apparatus is achieved that maintains sufficient strength, and maintains smooth operation of the work of making it possible to adjust the forward-backward position of a steering wheel and maintaining the steering wheel at the adjusted position even when a steering-lock apparatus is assembled. An approximately H-shaped slit 31 for expanding or contracting the inner diameter of a fitting-holding portion 30*a* of an outer column 10*b* comprises a main-slit section 39 and a pair of sub-slit sections 40*a*, 40*b*. Of the slit-end sections 41*a*, 41*b*, 42*a*, 42*b* of the sub-slit sections 40*a*, 40*b*, the rigidity in the direction of expansion or contraction of the width of the slit 31 in at least the portion where the closest-end section 41*a* that is located in a portion closest to a lock through hole 17*b* is formed is greater than the rigidity in the direction of expansion or contraction of the width of the slit 31 in the portions where the other slit-end sections 41*b*, 42*a*, 42*b* are formed.

7 Claims, 11 Drawing Sheets

(51) Int. Cl.
*B60R 25/021* (2013.01)
*B62D 1/184* (2006.01)
*B22D 19/04* (2006.01)
*B22D 19/16* (2006.01)
*B22D 17/00* (2006.01)

(56) References Cited

U.S. PATENT DOCUMENTS

| | | | | |
|---|---|---|---|---|
| 2010/0000366 A1* | 1/2010 | Nomura et al. | ................. | 74/493 |
| 2010/0139438 A1* | 6/2010 | Appleyard et al. | ............. | 74/493 |
| 2011/0005346 A1* | 1/2011 | Kwon | ............................ | 74/493 |
| 2011/0204610 A1 | 8/2011 | Kwon | | |
| 2014/0150596 A1 | 6/2014 | Nagasawa | | |
| 2014/0196564 A1* | 7/2014 | Bang et al. | ....................... | 74/493 |
| 2014/0311274 A1* | 10/2014 | Hong et al. | ..................... | 74/493 |
| 2015/0107398 A1* | 4/2015 | Nagasawa et al. | .............. | 74/493 |
| 2015/0122075 A1* | 5/2015 | Mihara et al. | ................... | 74/493 |

FOREIGN PATENT DOCUMENTS

| | | |
|---|---|---|
| JP | 2009-6847 A | 1/2009 |
| JP | 2009-202636 A | 9/2009 |
| WO | WO 2006/011378 A1 | 2/2006 |
| WO | WO 2013/015254 A1 | 1/2013 |

* cited by examiner

OUTER COLUMN FOR TELESCOPIC STEERING APPARATUS

TECHNICAL FIELD

The present relates to an outer column that is used in a telescopic steering apparatus that makes it possible to adjust the forward-backward position of a steering wheel.

BACKGROUND ART

Steering apparatuses such as illustrated in FIG. 12 are widely used for applying a steering angle to steered wheels (normally the front wheels) of an automobile. In this steering apparatus, a steering shaft 3 is supported on the inner-diameter side of a cylindrical steering column 2, which is supported by the vehicle body 1, so as to be able to rotate. A steering wheel 4 is fastened to the rear-end portion of the steering shaft 3 that protrudes further toward the rear than the opening on the rear end of the steering column 2. The rotation of the steering wheel 4 is transmitted to an input shaft 8 of a steering gear unit 7 by way of the steering shaft 3, a universal joint 5a, an intermediate shaft 6 and a universal joint 5b. The rotation of the input shaft 8 pushes or pulls a pair of tie rods 9 located on both sides of the steering gear unit 7, which applies a steering angle to the steered wheels according to the amount that the steering wheel 4 is operated.

The steering apparatus illustrated in FIG. 12 is provided with a telescopic mechanism for adjusting the forward-backward position of the steering wheel 4 according to the size and driving posture of the driver. The telescopic mechanism is constructed so that by fitting the front-end section of an outer column 10 on the rear side around the rear-end section of an inner column 29 on the front side so that relative displacement in the axial direction is possible, the steering column 2 has a telescopes shape, the overall length of which is able to extend or contract; and by combining an outer tube 11a and an inner shaft 11b by a spline joint, that steering shaft 3 is able to transmit torque, and can extend and contract.

Moreover, the steering column 2 and steering shaft 3 are constructed to be able to allow to displace the steering wheel 4 in the forward direction while absorbing impact energy during a collision accident. In other words, in a collision accident, after a primary collision in which an automobile collides with another automobile or the like, a secondary collision occurs when the body of the driver collides with the steering wheel 4, and in order to protect the driver by lessening the impact that is applied to the body of the driver during this secondary collision, the steering shaft 3 that supports the steering wheel 4 is supported by the vehicle body 1 so as to be able to move in the forward direction due to an impact load in the forward direction that occurs during the secondary collision. More specifically, the outer column 10 moves in the forward direction as the overall length of the steering column 2 contracts, and the outer tube 11a moves in the forward direction as the overall length of the steering shaft 3 contracts.

In recent years, as a measure to prevent automobile theft, automobiles have been equipped with various kinds of anti-theft apparatuses. One of these kinds of anti-theft apparatuses widely used is a steering-lock apparatus that does not allow operation of the steering wheel unless a proper key is used. FIG. 13 illustrates one example of a steering-lock apparatus as disclosed in JP 2008-265646 (A). This steering-lock apparatus 12 is provided with a lock unit 13 attached to part of the steering column 2a and a key-lock collar 15 having an engaging concave sections 14 formed in at least one location in the circumferential direction in a position that coincides with the phase in the axial direction of the lock unit 13, the key-lock collar 15 being fitted and fastened around part of the steering shaft 3. When operated (when locked), the tip-end section of a lock pin 16 of the lock unit 13 is displaced through a lock through hole 17 that is formed in the middle section in the axial direction of the steering column 2a toward the inner-diameter side of the steering column 2a, and by engaging with the engaging concave section 14, makes it essentially impossible to rotate the steering shaft 3a. In other words, when the steering wheel 4 is rotated with a force exceeding a specified value (value specified by the key-lock regulation) in a state in which the ignition key is turned OFF and the engaging concave section 14 and lock pin 16 are engaged, the steering shaft 3a will rotate with respect to the key-lock collar 15. However, when a force that is normally used for operating the steering wheel 4 is applied, the steering shaft 3 will not rotate. Steering-lock apparatuses having construction in which the key-lock collar 15 is fastened so as not to rotate relative to the steering shaft 3a, or having construction in which the key-lock collar 15 is integrally formed with the steering shaft 3a are also known. Furthermore, there are also steering-lock apparatus having construction in which breakage of the key-lock collar 15 or steering shaft 3a is prevented even when the steering wheel 4 is rotated with a force exceeding a specified value.

When the steering-lock apparatus 12 is assembled in the steering apparatus, the lock unit 13 is attached on the outer-diameter side of the steering column 2a, and the key-lock collar 15 is attached on the inner-diameter side of the steering column 2. Therefore, in order to arrange the key-lock collar 15 on the inner-diameter side of the steering column 2a so as to be able to rotate and to certainly allow the lock pin 16 and key-lock collar 15 to disengage without excessively increasing the stroke of the lock pin 16, it is necessary to make the outer diameter of the steering column 2a small and the inner diameter thereof large in at least in a portion of the steering column 2a where the steering-lock apparatus 12 is assembled, or in other words, it is necessary to make the thickness of the steering column 2a in that portion thin.

FIG. 14 illustrates an outer column 10a that is disclosed in JP 2007-223383 (A). The outer column 10a is integrally formed by die casting of a light alloy metal such as an aluminum alloy or magnesium alloy. Moreover, a fitting-holding portion 30 is provided in the end section in the axial direction of the outer column 10a for fitting the end section of a cylindrical shaped inner column inside so that relative displacement in the axial direction is possible, and a lock through hole 17a is provided in the middle section in the axial direction of the outer column 10a for assembling a steering-lock apparatus 12. With an outer column 10a having this kind of construction, there is a possibility that in the operated state of the steering-lock apparatus 12, the necessary strength will not be sufficiently maintained. In other words, when an attempt is made to rotate the steering wheel 4 with a large force in a state in which the lock pin 16 that protrudes through the lock through hole 17a into the inner-diameter side of the outer column 10a is engaged in the engaging concave section 14 of the key-lock collar 15, there is a possibility that the lock through hole 17a will deform due to an excessively large force. Therefore, in order to prevent such deformation, it is necessary to sufficiently maintain the strength of the outer column 10a. In order for this, the thickness of the outer column 10a can be increased, or the outer column 10a can be manufactured using an iron-based material, however, in that case a problem occurs in that the overall weight of the steering column increases.

RELATED LITERATURE

Patent Literature

[Patent Literature 1] JP 2008-265646 (A)
[Patent Literature 2] JP 2007-223383 (A)

SUMMARY OF INVENTION

Problem to be Solved by Invention

Taking into consideration the problem described above, the object of the present invention is to provide an outer column for a telescopic steering apparatus that maintains sufficient strength even when an anti-theft key-lock system is assembled, and sufficiently maintains smooth operation when making it possible to adjust the forward-backward position of the steering wheel or maintain the adjusted position.

Means for Solving Problems

The outer column for a telescopic steering apparatus of the present invention has:
a slit that is formed in one end section in the axial direction in order to enable expansion and contraction of the inner diameter of the outer column;
a pair of held-plate sections that are provided in positions on both sides of the slit in the width direction of the outer column; and
a lock through hole that is formed in a portion that is separated in the axial direction from the pair of held-plate sections, with the phase of the portion in the circumferential direction of the outer column being shifted from the center axis of the slit, so as to connect the inner circumferential surface and the outer circumferential surface. Moreover, long holes that extend in the axial direction are formed in portions of the pair of held-plate sections that are aligned with each other.

Particularly, in the one end section in the axial direction of the outer column for a telescopic steering apparatus of the present invention, at least the rigidity in the direction of expansion or contraction of the width of the slit in the portion closest in the axial direction to the lock through hole, and closest in the circumferential direction to the lock through hole is greater than the rigidity in the direction of expansion or contraction of the width of the slit in the portion that is closest in the axial direction to the lock through hole and separated the most in the circumferential direction from the lock through hole, the portion that is separated the most in the axial direction from the lock through hole and closest in the circumferential direction to the lock through hole, and the portion that is separated the most in the axial direction from the lock through hole and separated the most in the circumferential direction from the lock through hole. Preferably, together with the rigidity in the direction of expansion or contraction of the width of the slit in the portion closest in the axial direction to the lock through hole and closest in the circumferential direction to the lock through hole, the rigidity in the direction of expansion or contraction of the width of the slit in any one of the portions of the portion separated the most in the axial direction from the lock through hole and closest in the circumferential direction to the lock through hole, and the portion that is separated the most in the axial direction from the lock through hole and separated the most in the circumferential direction from the lock through hole is greater than the rigidity in the direction of expansion or contraction of the width of the slit in the remaining portions of the four portions.

More specifically, in the outer column for a telescopic steering apparatus of the present invention, the slit has an approximately H shape as seen in the radial direction, and has a main-slit section that is formed in the axial direction, and a pair of sub-slit sections that are formed in the circumferential direction at both end sections in the axial direction of the main-slit section, with middle sections in the circumferential direction of the sub-slit sections being continuous with the end sections in the axial direction of the main-slit section. Of the four end sections of the pair of sub-slit sections the four end sections each having a length in the circumferential direction from the main-slit section, at least the length in the circumferential direction from the main-slit section of the closest-end section of one sub-slit section, which is located on the side in the axial direction that is close to the lock through hole, and that is located in a portion in the circumferential direction that is close to the lock through hole, is shorter than the lengths in the circumferential direction from the main-slit section of the other end sections of the pair of sub-slit sections. With this construction, the rigidity in the direction of expansion or contraction of the width of the slit in the portion where the closest-end section is formed is greater than the rigidity in the direction of expansion or contraction of the width of the slit in the portions where the other end sections of the pair of sub-slit sections are formed.

Preferably, the length in the circumferential direction from the main slit section of the closest-end section is regulated so that the closest-end section is not located in the portion between the one held-plate section of the pair of held-plate sections that is provided on the side in the circumferential direction that is close to the lock through hole and the lock through hole, or in other words, so that the one held-plate section, the lock through hole and the closest-end section do not overlap in the axial direction.

Moreover, preferably the length in the circumferential direction from the main-slit section of one end section of the two end sections of the other sub-slit section of the pair of sub-slit sections that is located on the side in the axial direction close to the lock through hole is shorter than the length in the circumferential direction from the main-slit section of the other end section. With this construction, the rigidity in the direction of expansion or contraction of the width of the slit in the portion where the one end section of the other sub-slit section is formed is greater than the rigidity in the direction of expansion or contraction of the width of the slit in the portion where the other end section of the other sub-slit section is formed. Preferably, the one end section of the other sub-slit section is located at a diagonal position with respect to the closest-end section of the two end sections of the other sub-slit section, and is the farthest-end section that is located at a position the farthest from the lock through hole. Alternatively, the one end section of the other sub-slit section can be the end section of the two end sections of the other sub-slit section on the side in the circumferential direction that is close to the lock through hole.

Preferably, a reinforcing rib is provided in a portion that surrounds the closest-end section. More preferably, the reinforcing rib is provided in a state that linearly passes the closest-end section in the axial direction.

Moreover, the outer column of the present invention preferably has a main portion that is made using a light metal alloy and that has an end section, and a cylindrical shaped member that is made using an iron-based material and that has a middle section in the axial direction and an end section, the diameter of the end section being less than the diameter of the middle section in the axial direction; the outer column being constructed by joining together the main portion and the cylindrical shaped member in the axial direction by fitting and fastening the end section of the cylindrical shaped member inside the end section of the main portion. The slit and the pair of held-plate sections are provided in the main portion, and the lock through hole is provided in the cylindrical shaped member.

Effect of Invention

With the present invention, it is possible to maintain to a high degree the strength, rigidity and flexibility of the outer column for a telescopic steering apparatus. Therefore, when the steering wheel is rotated with the steering-lock apparatus operated as is, it is possible to reduce the stress that occurs in the fitting-holding portion of the outer column where the inner column is fitted and supported inside, and it is possible to keep the force required for expanding or contracting the inner diameter of the fitting-holding portion small. As a result, in the case of construction in which a steering-lock apparatus is provided, it is possible to sufficiently maintain smooth operation of the work of expanding or contracting the inner diameter of the fitting-holding portion in order to enable adjustment of the forward-backward position of the steering wheel or maintaining the steering wheel at the adjusted position, while at the same time sufficiently maintain the durability of the outer column, and thus it is possible to improve the operational feel of the adjustment lever.

MODES FOR CARRYING OUT INVENTION

FIRST EXAMPLE

Figure 1:
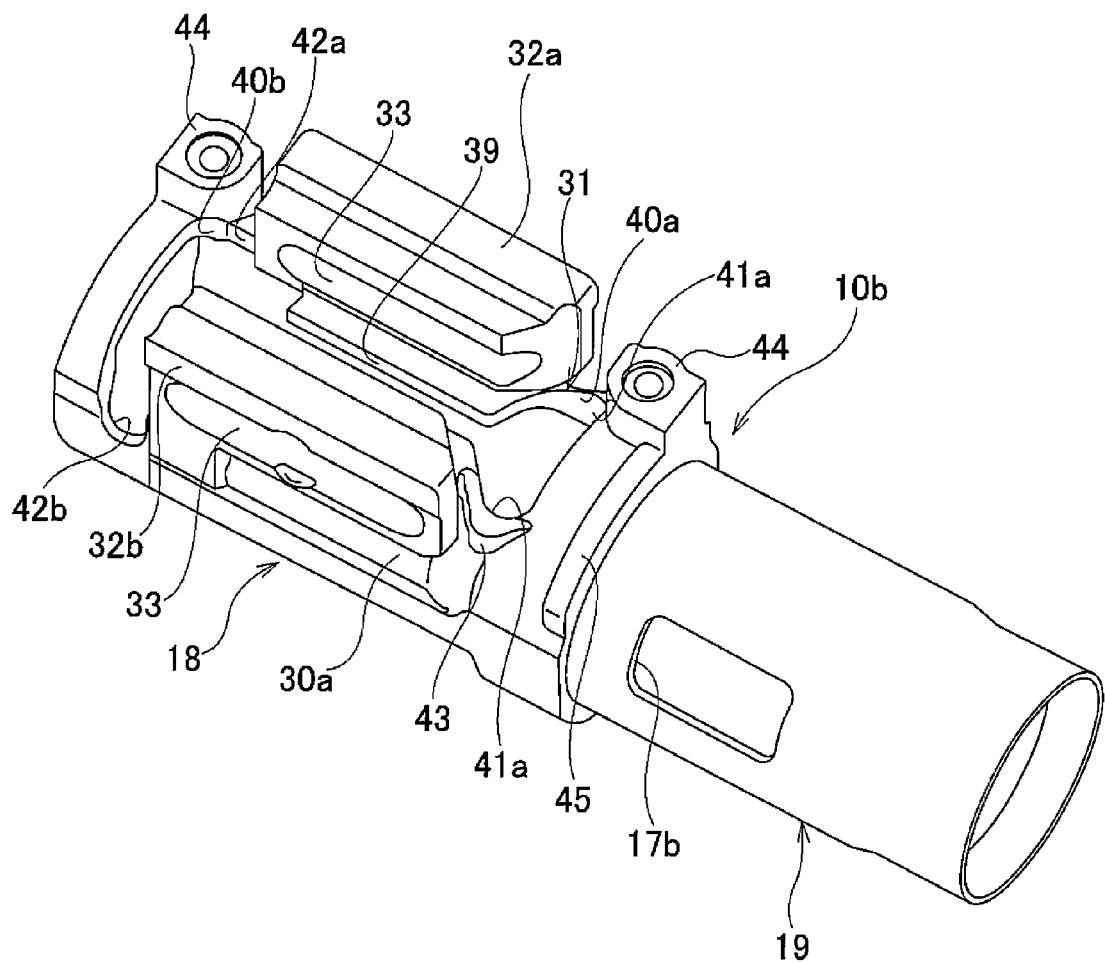
FIG. 1 is a perspective view of an outer column of a first example of an embodiment of the present invention as seen diagonally from underneath.
Figure 2:
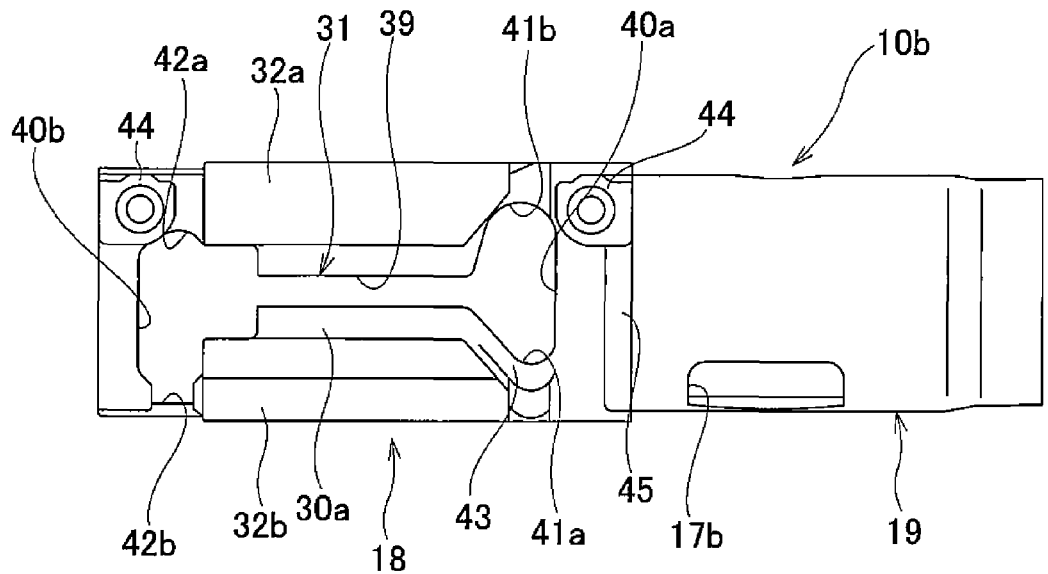
FIG. 2 is an orthographic projection of the outer column in the first example as seen from underneath.
Figure 3:
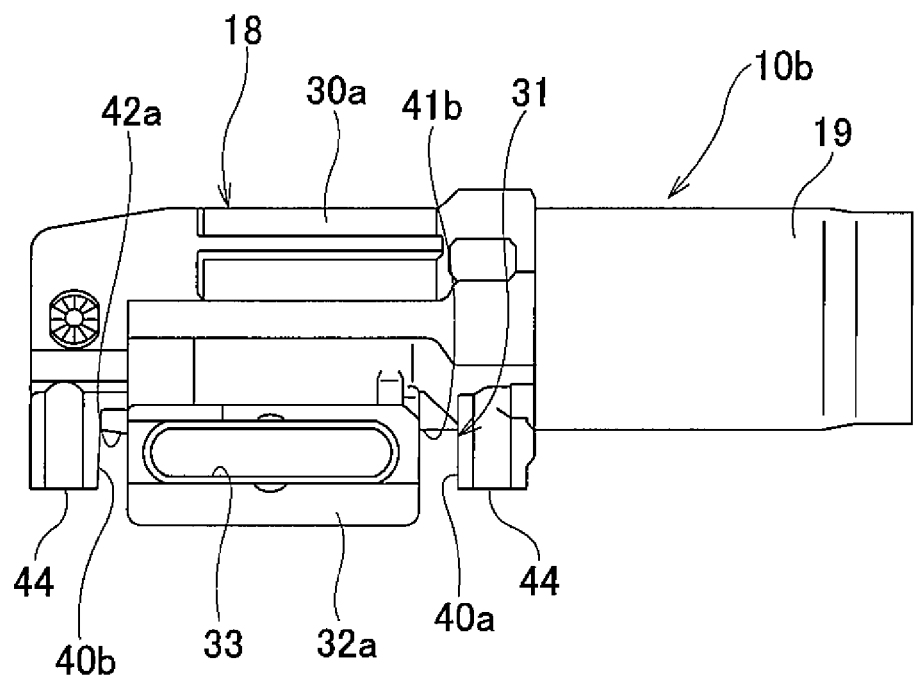
FIG. 3A is a side view as seen from above in FIG. 2.
FIG. 3B is a side view as seen from underneath in FIG. 2.
Figure 3:
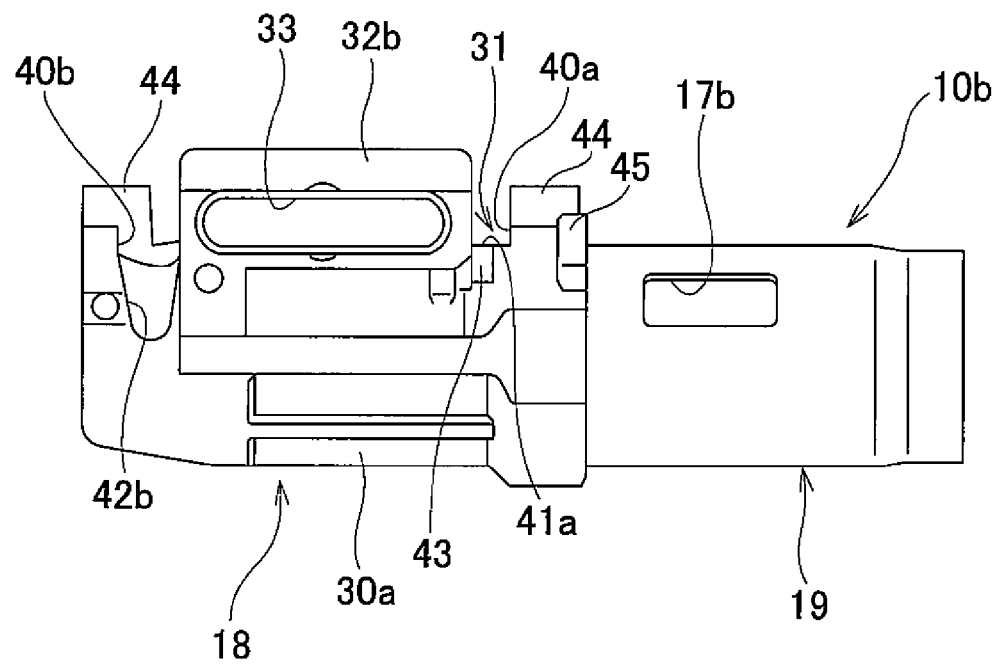
Figure 4:
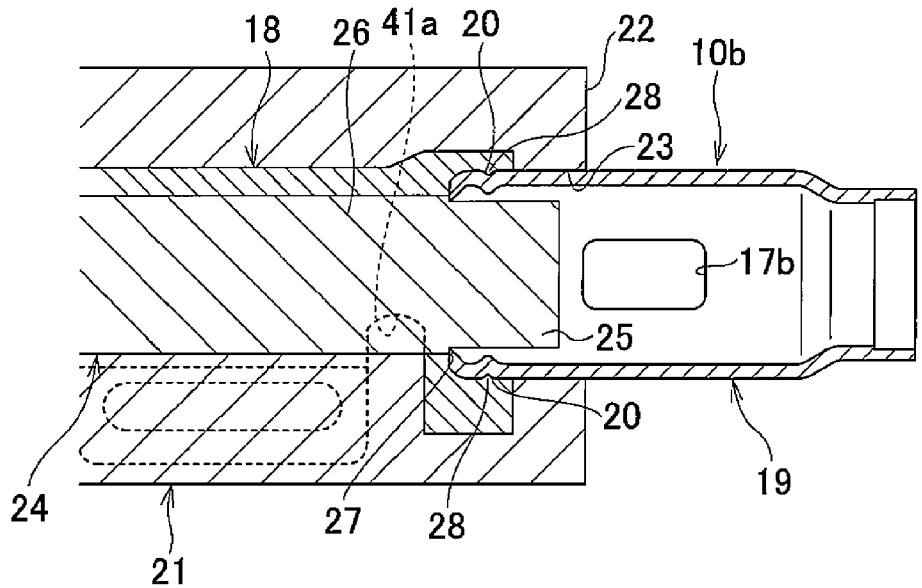
FIGS. 4A to 4C are cross-sectional views illustrating the order of processing of the production method for the outer column of the first example.
Figure 4:
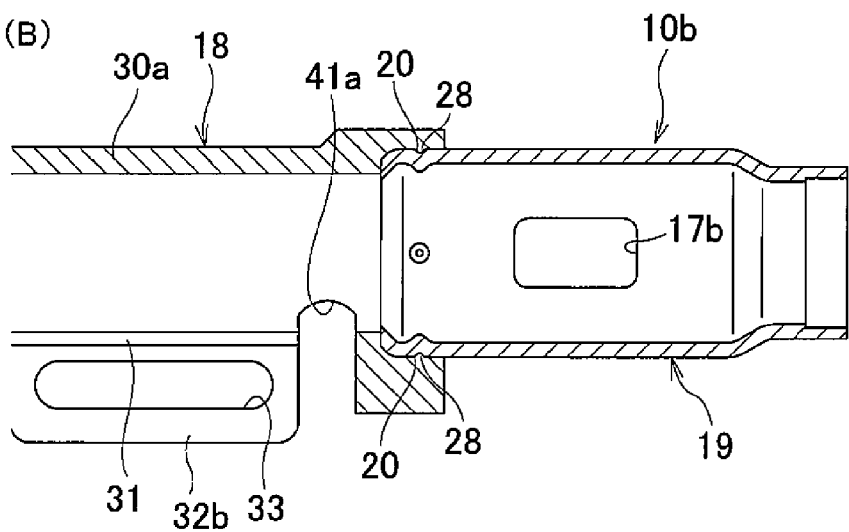
Figure 4:
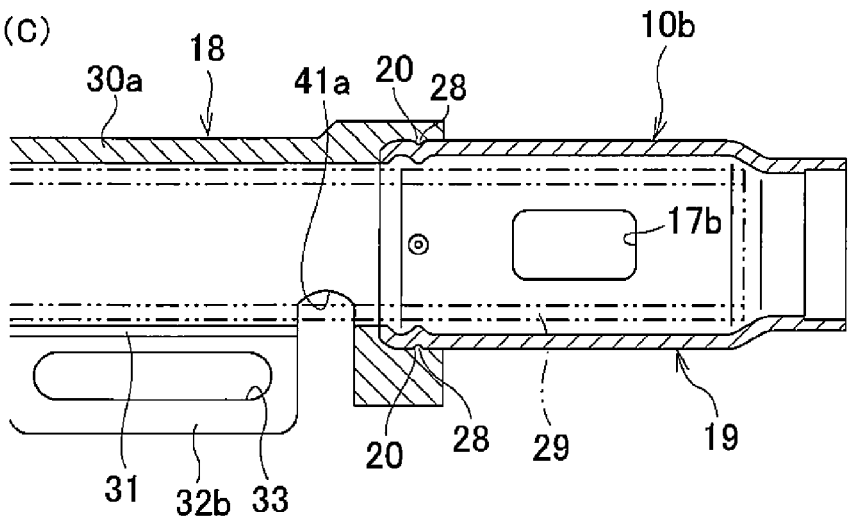
Figure 5:
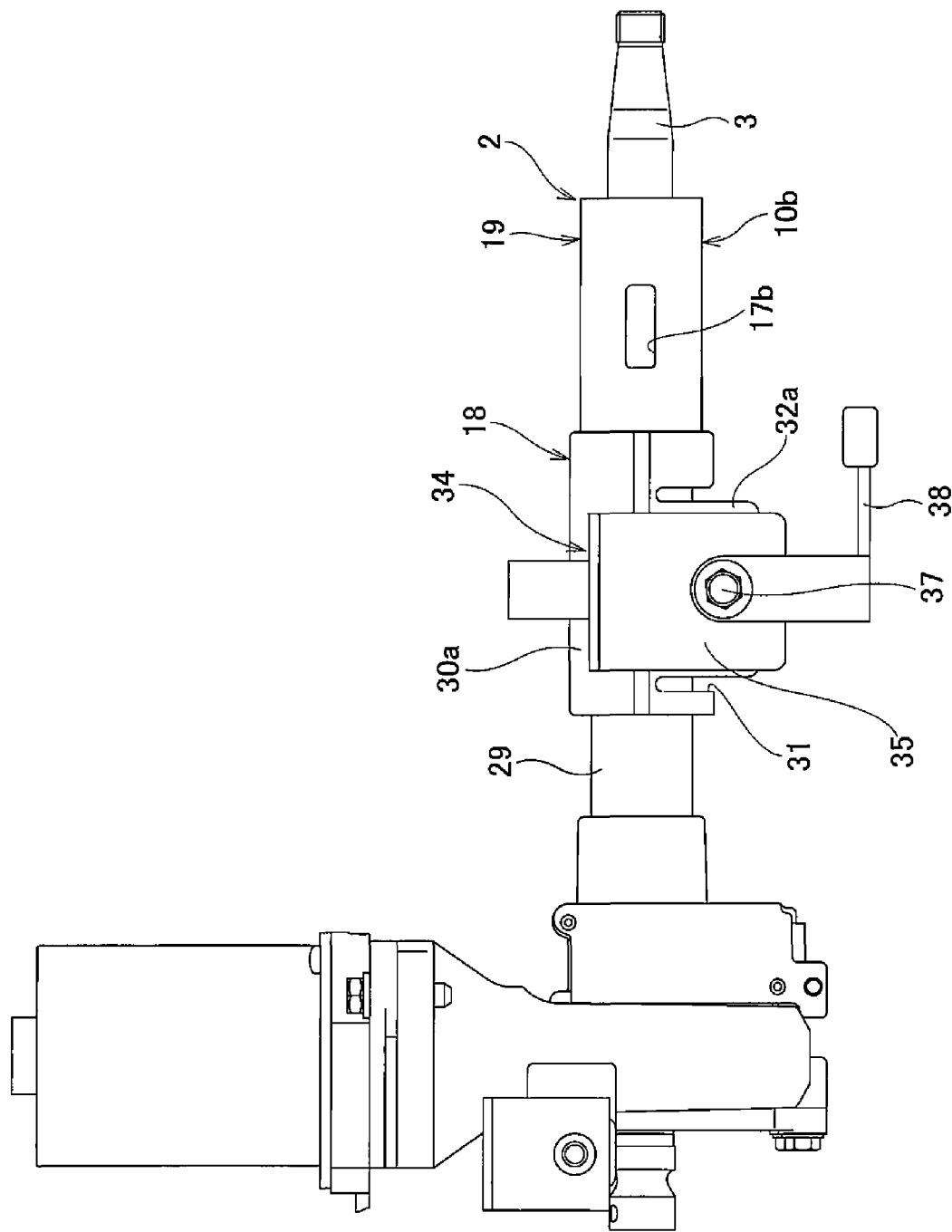
FIG. 5 is a side view illustrating an example of a steering apparatus in which the outer column of the first example has been assembled.
Figure 6:
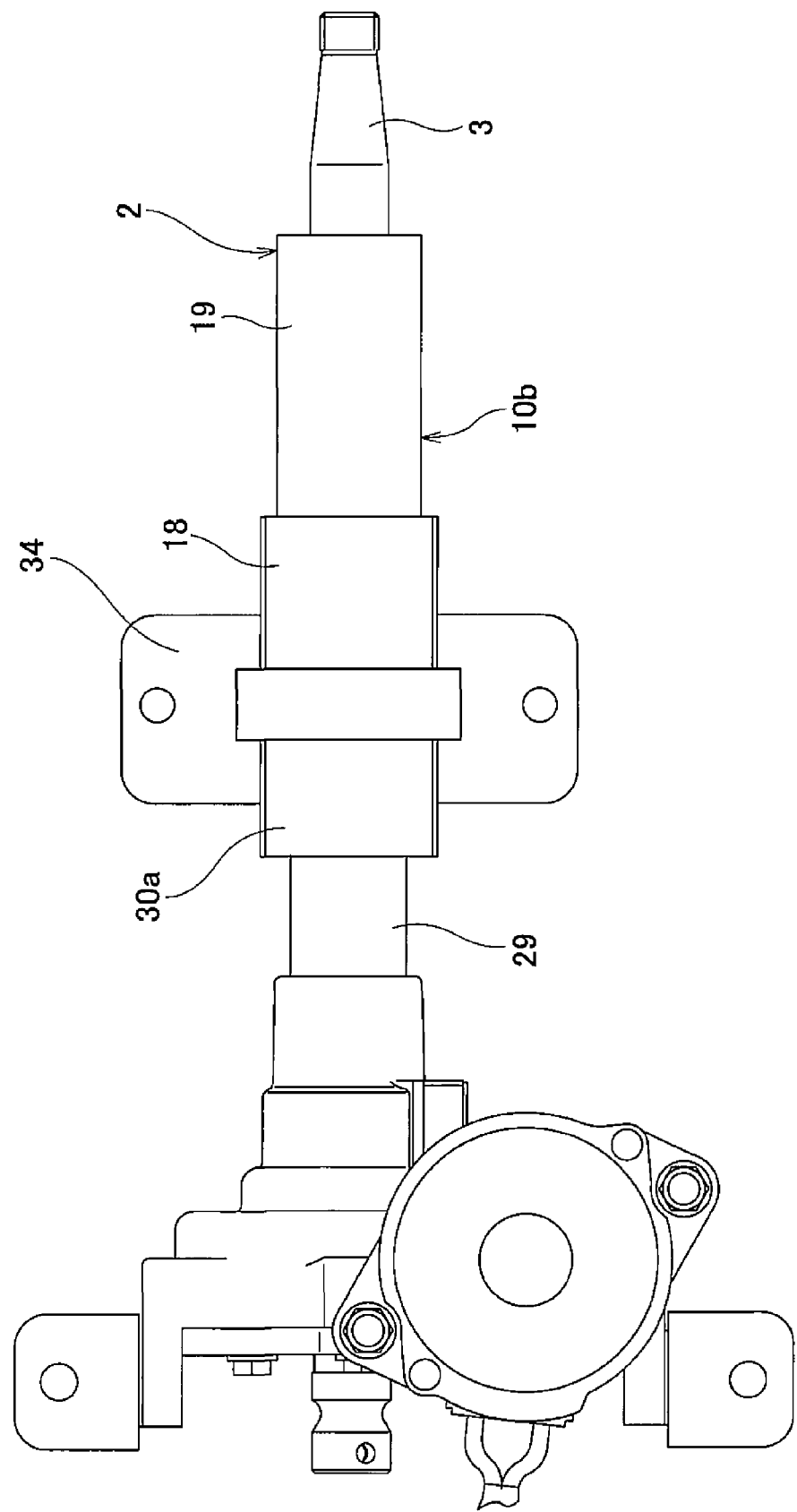
FIG. 6 is a top view as seen from above in FIG. 5.
Figure 7:
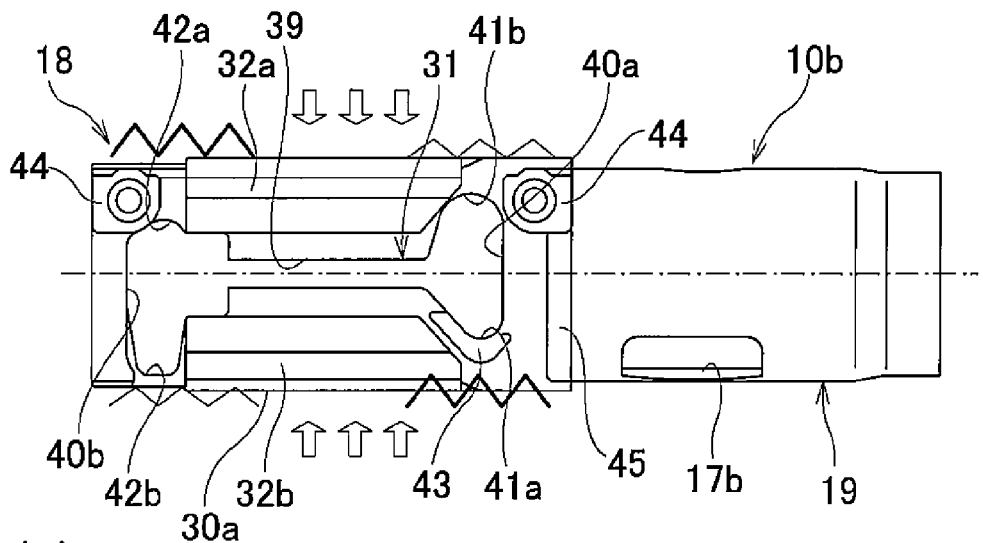
FIGS. 7A to 7B are views similar to FIG. 2 for explaining the state of forces applied to each of the parts in the first example.
Figure 7:
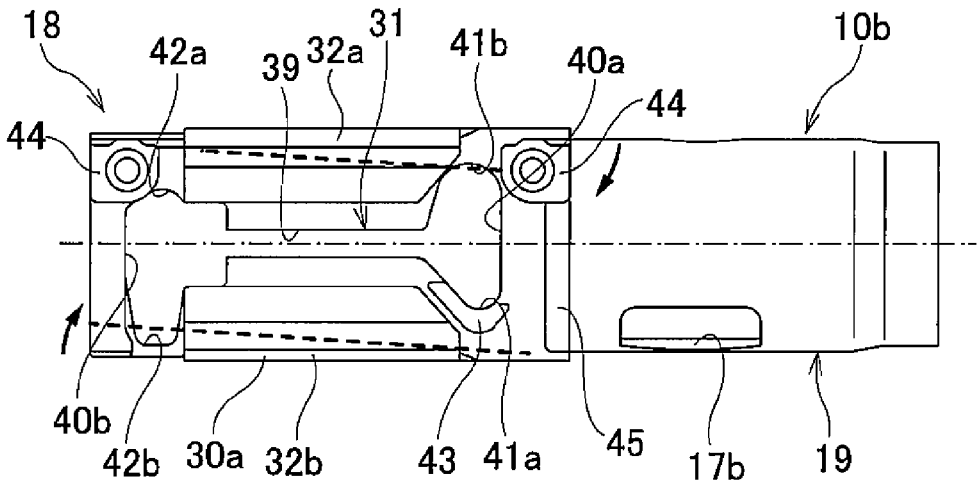
Figure 7:
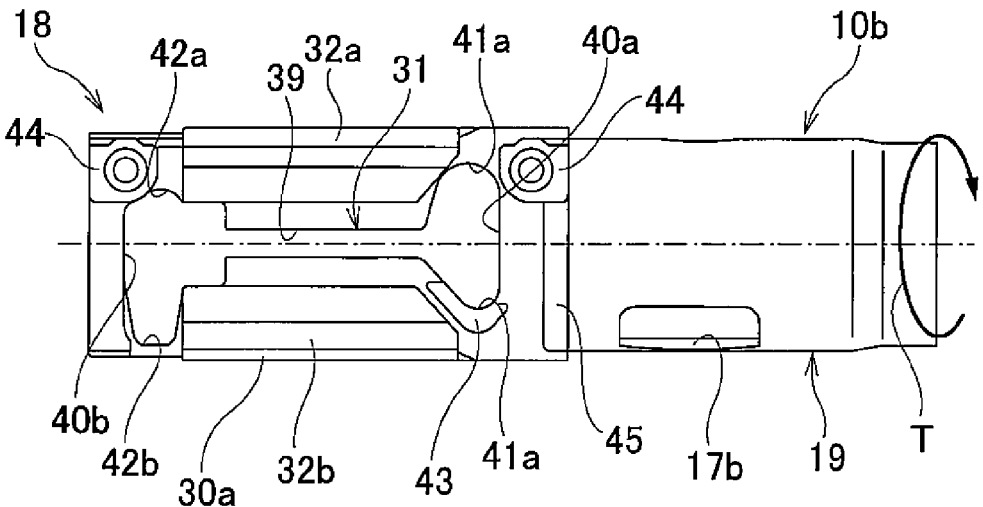

FIG. 1 to FIG. 5 illustrate a first example of an embodiment of the present invention. Features of this example are devising the shape of a slit 31 that is provided in an outer column 10b, and the construction of the area surrounding that slit 31. The construction, function and effects of the other parts, including the construction of an electric-powered power steering apparatus, are the same as in conventional construction. Therefore, the explanation below will center on the features of this example.

The outer column 10b of this example has a main portion 18 that is made using a light metal alloy such as an aluminum alloy, magnesium alloy or the like, and a cylindrical shaped member 19 that is made using an iron-based material such as carbon steel or the like. More specifically, as illustrated in FIG. 4A, by performing a drawing process on the front-end section (end section on the front side in the forward-backward direction of the vehicle body when the outer column 10b is assembled in the vehicle body) of the cylindrical shaped member 19, the dimension of the inner diameter of the front-end section of the cylindrical shaped member 19 is made to be smaller than the dimension of the inner diameter of the portion of the cylindrical shaped member 19 that is located on the inner-diameter side of the portion where the rear-end surface (end surface of the rear side in the forward-backward direction of the vehicle body when the outer column 10b is assembled in the vehicle) of the main portion 18 is formed. Moreover, concave sections 20 are provided at plural locations in the circumferential direction on the outer-circumferential surface of the front-end section of the cylindrical shaped member 19 (4 locations in the example in the figures) by performing a pressing process. Then, as illustrated in FIG. 4A, the portion near the front end of the cylindrical shaped member 19 is inserted into an insertion hole 23 that is opened on the end surface 22 of a die 21, and caused to protrude inside the die 21.

The tip-end section 25 of the core 24 is inserted into the inner-diameter side of the front-end section of the cylindrical shaped member 19, and a stepped surface 27 that is provided between the tip-end section 25 and base-end section 26 of the core 24 comes in contact with the front-end surface of the cylindrical shaped member 19. In this state, by feeding molten metal such as an aluminum alloy, magnesium alloy or the like into the die 21, the main portion 18 is formed. By feeding part of the molten metal into the concave sections 20 of the cylindrical shaped member 19, convex sections 28 are formed on the inner-circumferential surface of the rear-end section of the main portion 18. As illustrated in FIG. 4B, the cylindrical shaped member 19 is removed from the die 21, and then as illustrated in FIG. 4C, machining is performed on the inner-circumferential edge of the front-end section of the cylindrical shaped member 19 that protrudes further inward in the radial direction than the inner-circumferential surface of the main portion 18 to make the inner diameter of at least the portion near the front end of the cylindrical shaped member 19 equal to or greater than the inner diameter of the portion of the main portion 18 that is separated in the axial direction from the fitting section of the cylindrical shaped member 19. When necessary, machining is also performed at the same time on the potion near the rear end of the inner-circumferential surface of the main portion 18 in order that there are no stepped surfaces facing the forward direction that could become an obstacle to smooth displacement in the forward direction of the outer column 10b during a secondary collision. The diameter of the inscribed circle of the protrusions that exist in portions on the inner-circumferential surface of the front-end section of the cylindrical shaped member 19 that correspond to the concave sections 20 is equal to or greater than the inner diameter of the portion of the main portion 18 that is separated in the axial direction of the fitting portion of the cylindrical shaped member 19, and the tip ends of these protrusions do not protrude further inward in the radial direction than the inner-circumferential surface of the non-fitting portion of the main portion 18.

In the outer column 10b of this example, the portion near the rear-end section thereof is constructed by a cylindrical shaped member 19 that is made using an iron-based material for which it is easy to maintain the strength, so it is possible to maintain the overall strength of the outer column 10b even when, in order to install a lock unit 13 (see FIG. 13) or key-lock collar 15, the thickness of that portion is made thin or a lock through hole 17b for passing a lock-pin 16 through is provided. Moreover, the concave sections 20 that are formed on the outer-circumferential surface of the front-end section of the cylindrical shaped member 19 engage with the convex sections 28 that are formed on the inner-circumferential surface of the rear-end section of the main portion 18, so the joint strength in the axial direction between the main portion 18 and the cylindrical shaped member 19 is sufficiently maintained. Furthermore, even when there is an attempt to rotate the steering wheel 4 with a large force in a state in which the lock pin 16 is engaged with the key-lock collar 15, the high torsional rigidity of the joint section between the main portion 18 and the cylindrical shaped member 19 is maintained due to the engagement of the concave sections 20 and convex sections 28.

In order to keep the contact pressure between the inner-circumferential surface of the outer column 10b and the outer-circumferential surface of the inner column 29 sufficiently high as the adjustment lever 38 is operated, a slit 31 is provided on the front-end section of the outer column 10b that fits with the inner column 29 by fitting around the outside of the rear-end section of the inner column 29. In this example, the slit 31 is provided on the main portion 18. Furthermore, in this example, the slit 31 has an approximately H shape as seen in the radial direction. More specifically, the slit 31 is constructed by a main-slit section 39 and a pair of sub-slit sections 40a, 40b. The main-slit section 39 is formed in the axial direction of the outer column 10b (parallel to the center axis), and is provided in a center position between a pair of held-plate sections 32a, 32b of the outer column 10b. The sub-slit sections 40a, 40b are formed in the circumferential direction on both end sections in the forward-backward direction of the main-slit section 39, and the end sections in the forward-backward direction of the main-slit section 39 are continuous with the middle section in the circumferential direction of the sub-slit sections 40a, 40b. In consideration that there is a possibility that strength will be insufficient due to leaking of molten metal when die casting the main portion 18 or due to an insufficient fitting length when the rear-end edge of the sub-slit section 40a of the sub-slit sections 40a, 40b that is provided on the rear side in the axial direction near the lock through hole 17b (right side in FIG. 1 to FIG. 7) overlaps the cylindrical shaped member 19 in the radial direction, that rear-end edge is regulated so as to exist in a location that does not overlap the cylindrical shaped member 19 in the radial direction. In other words, the rear-end edge of the sub-slit section 40a is located further toward the front than the front-end surface of the cylindrical shaped member 19.

Figure 12:
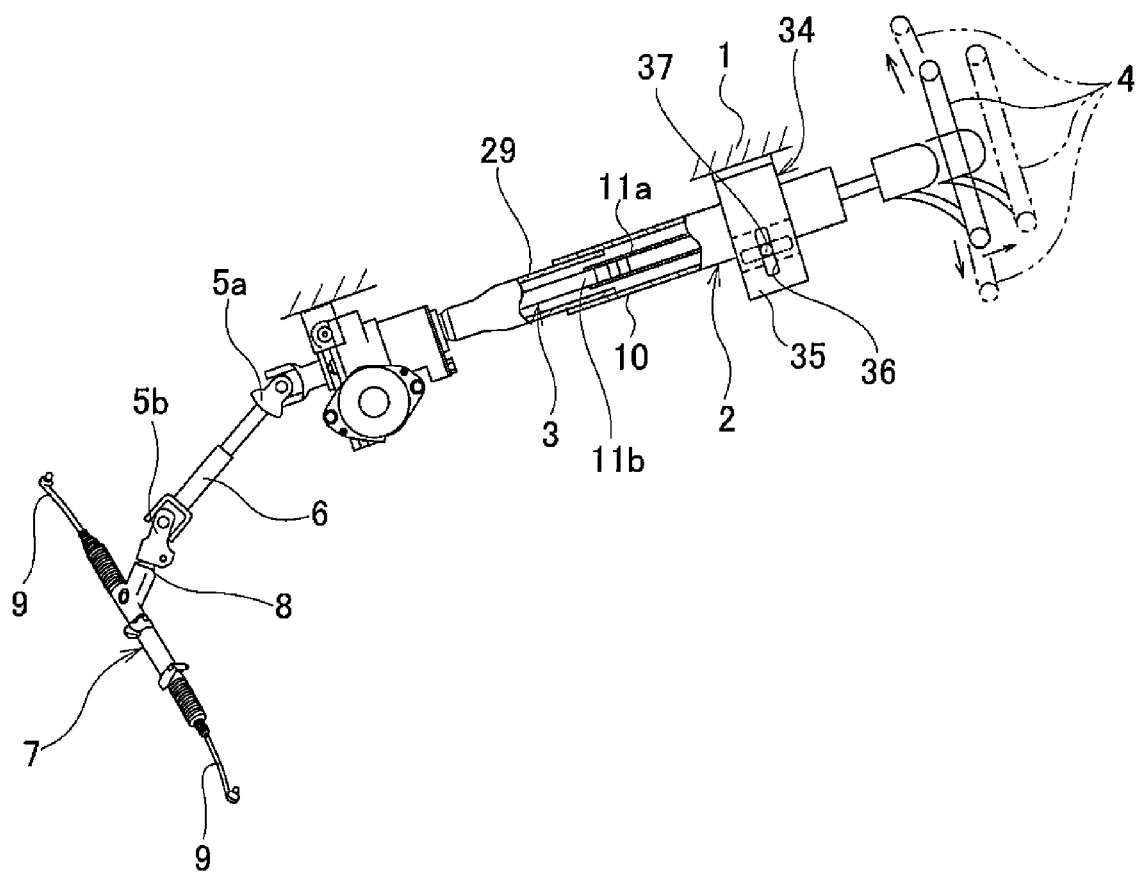
FIG. 12 is a partial cross-sectional view illustrating an example of a conventional steering apparatus for an automobile.

The pair of held-plate sections 32a, 32b are provided at positions on the outer-circumferential surface of the main portion 18 that are on both sides in the width direction of the slit 31, and are the integrally formed with the main portion 18. Moreover, long holes 33 in the forward-backward direction that extend in the axial direction of the outer column 10b are formed in portions of the held-plate sections 32a, 32b that are aligned with each other. In the assembled state of the steering apparatus, the pair of held-plate sections 32a, 32b are held between a pair of holding plates 35 of a vehicle-side bracket 34. Through holes 36 are formed in portions of the pair of holding plates 35 that are aligned with each other. An adjustment rod 37 is inserted through the long holes 33 in the forward-backward direction and the through holes 33. A pair of pressure sections is provided in portions on both end sections of the adjustment rod 37 that protrude from the outside surfaces of the pair of holding plates 35 in a state so as to face the outside surfaces of the pair of holding plates 35. The adjustment rod 37 and pair of pressure sections are constructed so that as the adjustment lever 38 is operated, the space between the pressure sections can be contracted or expanded, which increases or decreases the size of the pressure by which the pair of holding plates 35 press the pair of held-plate sections 32a, 32b in a direction toward each other. When the pressure by which the pair of held-plate sections 32a, 32b are pressed in a direction toward each other by expanding the space between the pressure sections, the inner diameter of a fitting-holding portion 30a expands, and the contact pressure between the inner-circumferential surface of the fitting-holding portion 30a and the outer-circumferential surface of the inner column 29 is reduced. As a result, it is possible to adjust the forward-backward position of the steering wheel 4 (see FIG. 12) that is supported by and fastened to the rear-end section of the steering shaft 3 within the range in which the adjustment rod 37 is able to move inside the long holes 33 in the forward-backward direction. When the pressure by which the pair of held-plate sections 32a, 32b are pressed in a direction toward each other is increased by contracting the space between the pressure sections, the inner diameter of the fitting-holding portion 30a is contracted, and the contact pressure between the inner-circumferential surface of the fitting-holding portion 30a and the outer-circumferential surface of the inner column 29 is increased. As a result, the forward-backward position of the steering wheel 4 is maintained at the adjusted position. The shape of the pair of held-plate sections 32a, 32b can be symmetric about the center axis of the slit 31 (main-slit section 39), or can be different from each other (asymmetric).

Installation sections 44 for fastening a harness and column cover are provided on both end sections in the forward-backward direction of the outer-circumferential surface of the main portion 18, the installation sections 44 protruding downward and having screw holes that are formed in the tip-end surfaces thereof. In this example, the installation sections 44 are provided in portions on both sides in the forward-backward direction of one of the held-plate sections 32a that is provided on the far side in the circumferential direction from the lock through hole 17b.

On the other hand, a rectangular through hole 17b is formed in part of the cylindrical shaped member 19 and connects the inner circumferential surface and the outer circumferential surface of the cylindrical shaped member 19. In a state in which the cylindrical shaped member 19 and main portion 18 are connected and fastened, the lock through hole 17b is located in a portion that is separated in the axial direction of the held-plate sections 32a, 32b, and where the phase in the circumferential direction is separated from the slit 31 (main-slit section 39 and sub-slit section 40a on the rear side). In this example, the lock through hole 17b is located within a range of where the shift in phase from the center axis of the slit 31 (main-slit section 39) is 90 degrees or less (approximately 45 degrees in the example in the figure).

In this example, the length in the circumferential direction from the main-slit section 39 of the closest-end section 41a of the two slit end sections 41a, 41b on both ends of the sub-slit section 40a on the rear side that is located in the portion close in the circumferential direction to the lock through hole 17b is shorter than the length in the circumferential direction from the main-slit section 39 of the remaining slit-end section 41b. More specifically, the length in the circumferential direction of the closest-end section 41a is regulated so that the closest-end section 41a is not located in the portion between the other held-plate section 32b of the held-plate sections 32a, 32b that is provided on the side in the circumferential direction that is close to the lock-through hole 17b and the lock through hole 17b, or in other word, so that the other held-plate section 32b and lock through hole 17b do not overlap in the axial direction with the closest-end section 41a. As a result, the rigidity in the direction of expansion or contraction of the width of the slit 31 in the portion where the closest-end section 41a is formed is greater than the rigidity in the direction of expansion or contraction of the width of the slit 31 in the portion where the slit-end section 41b is formed.

Furthermore, of the two slit-end sections 42a, 42b on both end sections of the sub-slit section 41b on the front side, the length in the circumferential direction from the main-slit section 39 of the farthest-end section 42a that is located at a diagonal position with respect to the closest-end section 41a and that is in a position separated the farthest from the lock through hole 17b is shorter than the length in the circumferential direction from the main-slit section 39 of the remaining slit-end section 42b. As a result, the rigidity in the direction of expansion or contraction of the width of the slit 31 in the portion of the outer column 10b (fitting-holding portion 30a) where the farthest-end section 42a is formed is higher than the rigidity in the direction of expansion or contraction of the width of the slit 31 in the portion where the slit-end section 42b is formed.

An L-shaped or J-shaped reinforcing rib 43, having a thickness that is greater than the other portions, is formed in the adjacent portion surrounding the closest-end section 41a on the outer-circumferential surface of the fitting-holding portion 30a. In this example, the position and size of the reinforcing rib 43 are regulated so that the reinforcing rib 43 is located in the portion between the other held-plate section 32b and the lock through hole 17b (overlaps in the axial direction). In this way, the rigidity of the fitting-holding portion 30a of the outer column 10b is adjusted by making the lengths in the circumferential direction of the sub-slit sections 40a, 40b different from each other on both sides in the width direction (left and right) of the main-slit section 39 and by forming a reinforcing rib 43 in part.

The effect of making the rigidity in the direction of expansion or contraction of the width of the slit section 31 in the portion where the closest-end section 41a is formed greater than the rigidity in the direction of expansion or contraction of the width of the slit 31 in the portion where the remaining slit-end section 41b is formed is explained with reference to FIG. 7A to FIG. 7C.

(1) Rigidity and strength in the torsional direction:

The rigidity and strength in the torsional direction are preferably as large as possible in order to prevent the occurrence of damage such as cracking of the fitting-holding portion 30a even when the steering wheel 4 is strongly rotated in a state in which the steering-lock apparatus 12 (see FIG. 13) is operated.

(2) Rigidity in a direction that separates or brings closer together the held-plate sections 32a, 32b in order to expand or contract the inner diameter:

The rigidity in a direction that separates or brings closer together the held-plate sections 32a, 32b is preferably set appropriately low in order to smoothly perform the work of expanding or contracting the inner diameter of the fitting-holding portion 30a so as to switch between allowing or not allowing adjustment of the forward-backward position of the steering wheel 4.

Figure 13:
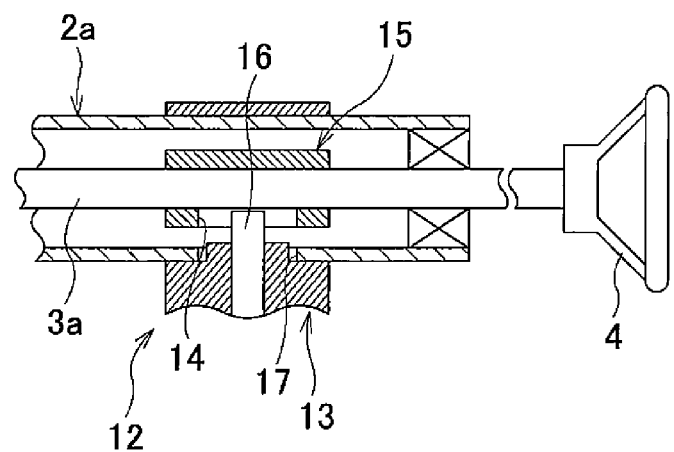
FIG. 13 is a partial cross-sectional side view illustrating an example of a steering apparatus for an automobile in which a conventional steering-lock apparatus is assembled.
Figure 14:
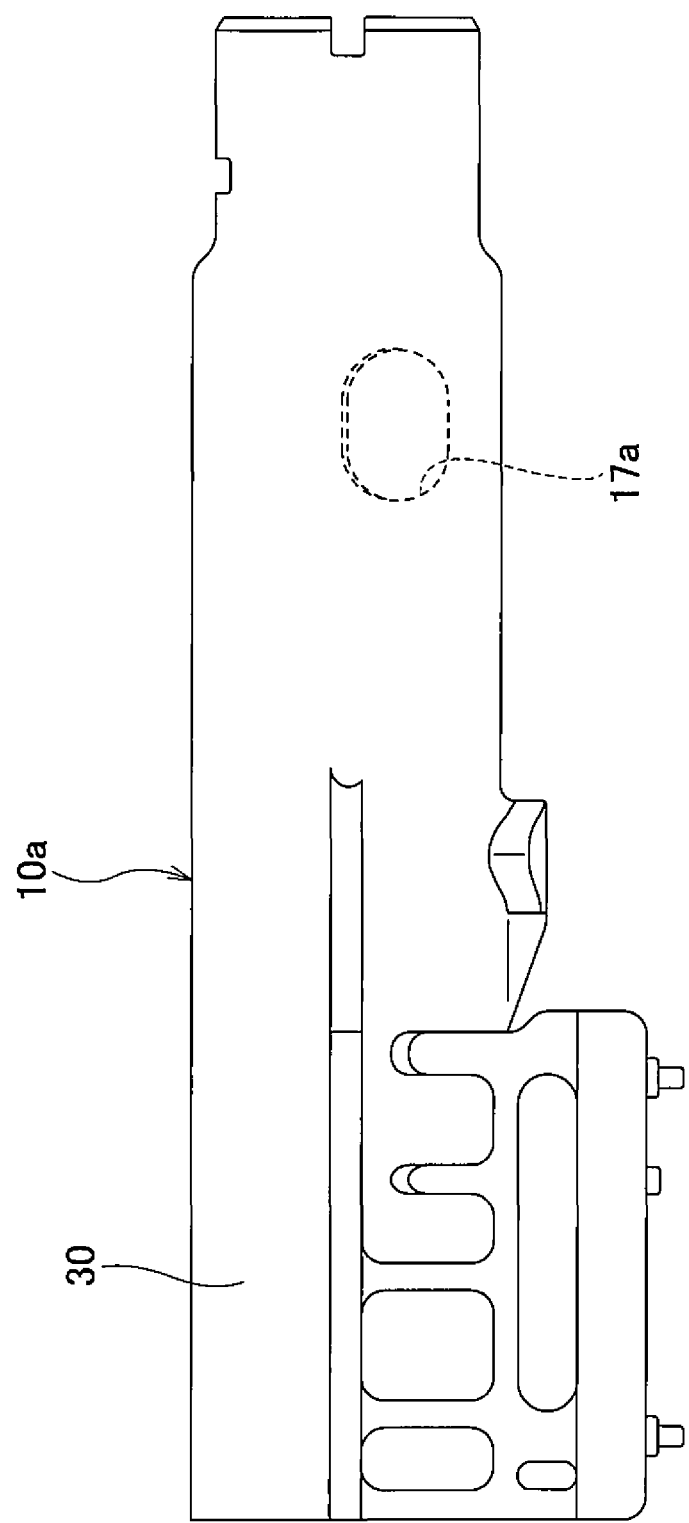
FIG. 14 is a side view illustrating an example of a conventional light metal alloy outer column.

When the steering wheel 4 has been strongly rotated in a state in which the steering-lock apparatus 12 is operated, a large torque T is applied as indicated by the bold arrows in FIG. 7C to the cylindrical shaped member 19 of the outer column 10 due to the engagement between the lock through hole 17b and the lock pin 16 (see FIG. 13). The torque T is transmitted to the fitting-holding portion 30a of the outer column 10c by way of the connection between the cylindrical shaped member 19 and the main portion 18, however, when a large torque is transmitted to the fitting-holding portion 30a in this way, large stress occurs in part of the slit 31 that is formed in the fitting-holding portion 30a. The size of the stress that occurs in this way becomes larger in portions nearer to the lock through hole 17b, which is the site where the torque T occurs, or becomes larger the lower the rigidity in the direction of expansion or contraction of the width of the slit 31 in this portion is. Therefore, when no countermeasures are taken, large stress occurs in the closest-end section 41a portion of the slit 31 that is formed in the fitting-holding portion 30a that is closest to the lock through hole 17b, and it becomes easy for damage such as cracking to occur in this portion.

In this example, the rigidity of the portion of the slit 31 where the closest-end section 41a is formed is kept low by suppressing the length in the circumferential direction of the closest-end section 41a. Moreover, the rigidity in the direction of expansion or contraction of the width of the slit 31 of the portion where the closest-end section 41a is formed is made to be high by the reinforcing rib 43 that is provided in the portion adjacent to the closest-end section 41a. Therefore, the strength and rigidity of the portion of the fitting-holding portion 30a for which strength and rigidity related to the operation of the steering-lock apparatus 12 is particularly necessary are sufficiently maintained. As a result, when the steering wheel 4 is strongly rotated in a state in which the steering-lock apparatus 12 is operated, the occurrence of damage such as cracking to part of the slit 31 is suppressed regardless of the large torsional stress that is applied to the fitting-holding portion 30a.

On the other hand, when the adjustment lever 38 is operated in order to maintain the forward-backward position of the steering wheel 4 in the adjustment position, a force in a direction that would bring the held-plate sections 32a, 32b closer together is applied to the held-plate sections 32a, 32b from the holding plates 35 as illustrated by the bold white arrows in FIG. 7A. In the case of the construction of the outer column 10c of this example, the rigidity in the direction of expansion or contraction of the slit 31 in the portions corresponding to the closest-end section 41a and farthest-end section 42a of the portions of the fitting-holding portion 30a where the held-plate sections 32a, 32b are provided as indicated by the bold wave-shaped lines in FIG. 7A is high, however, the rigidity in the direction of expansion or contraction of the width of the slit 31 in the portions corresponding to the slit-end sections 41b, 42b as indicated by the thin wave-shaped lines in FIG. 7A remains low. Therefore, it is possible to maintain the flexibility of the fitting-holding portion 30a to a certain extent, so even without applying a large operating force to the adjustment lever 38, it is possible to sufficiently maintain the amount of elastic transformation of the portions of the held-plate sections 32a, 32b on the slit-end section 41b, 42b side, and thus it is possible to bring the held-plate sections 32a, 32b sufficiently close together.

Moreover, the held-plate sections 32a, 32b elastically deform in the direction illustrated in FIG. 7B due to a force that is applied in the direction of the bold white arrows by the operation of the adjustment lever 38. In other words, with respect to the axial direction of the outer column 10b, the amount of elastic deformation is large on the slit-end section 41b, 42b side where the rigidity in the direction of expansion or contraction of the width of the slit 31 is low, and the amount of elastic deformation is small on the closest-end section 41a and farthest-end section 42a side where the rigidity in the direction of expansion or contraction of the width of the slit 31 is high, so the relationship of the size of the amount of elastic deformation due to the force that is applied in the direction of the bold white arrows to the held-plate sections 32a, 32b is opposite each other with respect to the axial direction of the outer column 10c. Therefore, in a state in which the held-plate sections 32a, 32b have been elastically deformed due to a force applied in the direction of the bold white arrows, the length direction of the held-plate sections 32a, 32b and the axial direction of the outer column 10b do not coincide, however the parallel state of the held-plate sections 32a, 32b is maintained. As a result, the surface pressure at the area of contact between the inner-circumferential surface of the fitting-holding portion 30a and the outer-circumferential surface of the inner column 29 can be uniformly increased over the entire length in the axial direction, so smooth operation of the work of expanding or contracting the inner diameter of the outer column 10b is maintained, and thus the clamping ability of the outer column 10b can be made to be good.

As was explained above, with the outer column 10b of this example, by connecting the main portion 18 made using light metal alloy with the cylindrical shaped member 19 made using an iron-based material, it is possible to maintain to a high degree both the strength and rigidity of the outer column 10b as well as the flexibility of the outer column 10b even when it is not possible to sufficiently increase the dimension in the axial direction of the main portion 18 and the layout space is limited. Therefore, even when the steering wheel 4 is rotated with the steering-lock apparatus 12 in the operated state, it is possible to reduce the stress that occurs in the fitting-holding portion 30a, and it is possible to keep the force required for expanding or contracting the inner diameter of the fitting-holding portion 30a small. As a result, in construction in which a steering-lock apparatus is provided, it is possible to maintain smooth operation of the work for expanding or contracting the inner diameter of the fitting-holding portion 30a in order to make it possible to adjust the forward-backward position of the steering wheel 4, or maintain the forward-backward position of the steering wheel 4 after adjustment, while at the same time sufficiently maintain the durability of the outer column 10b, so it is possible to improve the operational feel of the adjustment lever 38.

Moreover, as the rigidity of the rear-end section of the fitting-holding portion 30a is made to be higher on the closest-end section 41a side than on the remaining slit-end section 41b side, the force required for operating the adjustment lever 38 in a state in which the adjustment rod 37 is positioned at the rear-end section of the long holes 33 in the forward-backward direction becomes higher than before the rigidity in the direction of expansion or contraction of the width of the slit 31 on the closest-end section 41a side was increased. However, the rigidity of the front-end section of the fitting-holding portion 30a is higher on the farthest-end section 42a side than on the remaining slit-end section 42b side, so the force required for operating the adjustment lever 38 in a state in which the adjustment rod 37 is positioned at the front-end section of the long holes 33 in the forward-backward direction similarly becomes large. As a result, sudden change in the force required for operating the adjustment lever 38 due to displacement in the forward-backward direction of the adjustment rod 37 is prevented.

SECOND EXAMPLE

Figure 8:
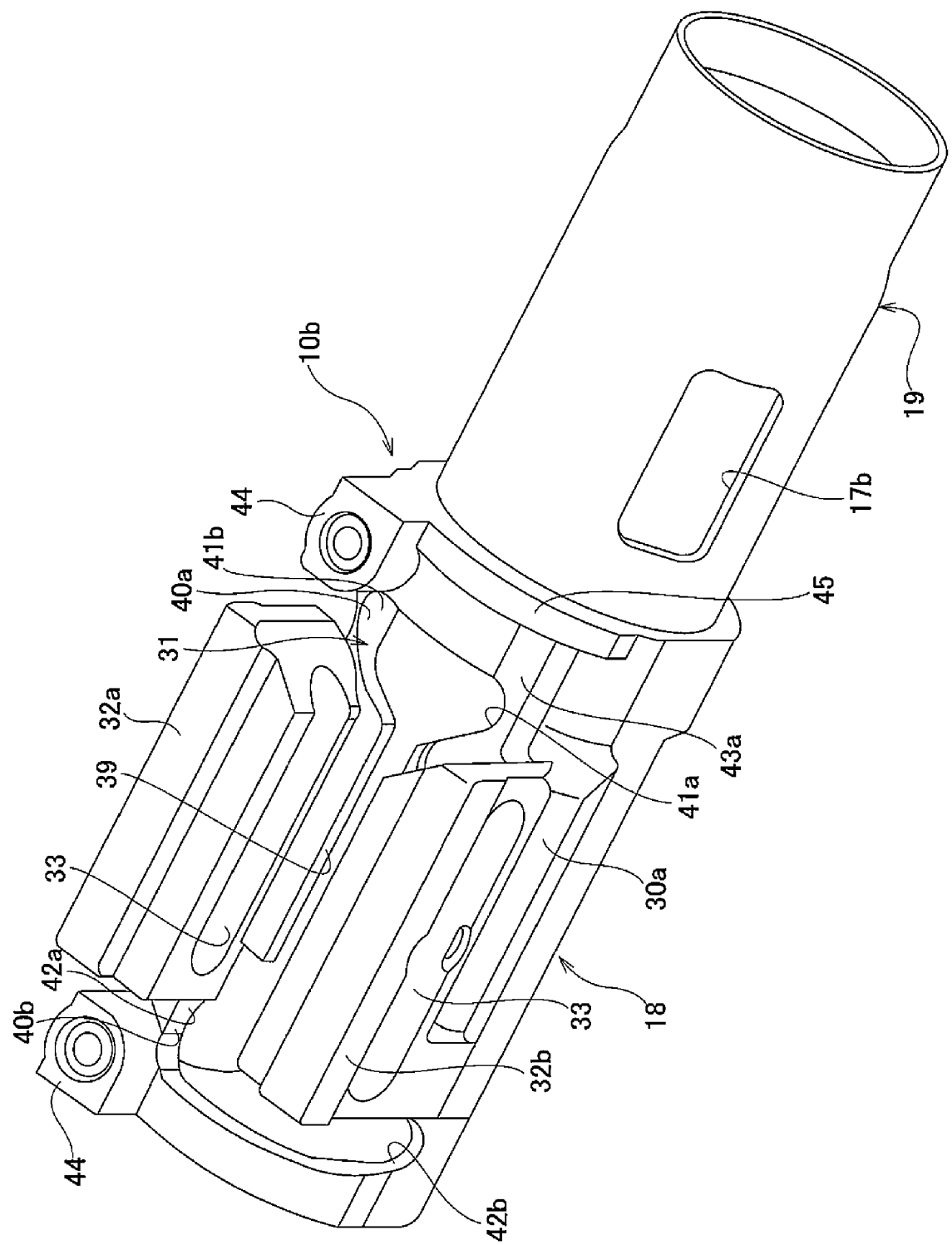
FIG. 8 is a view similar to FIG. 1 illustrating a second example of an embodiment of the present invention.
Figure 9:
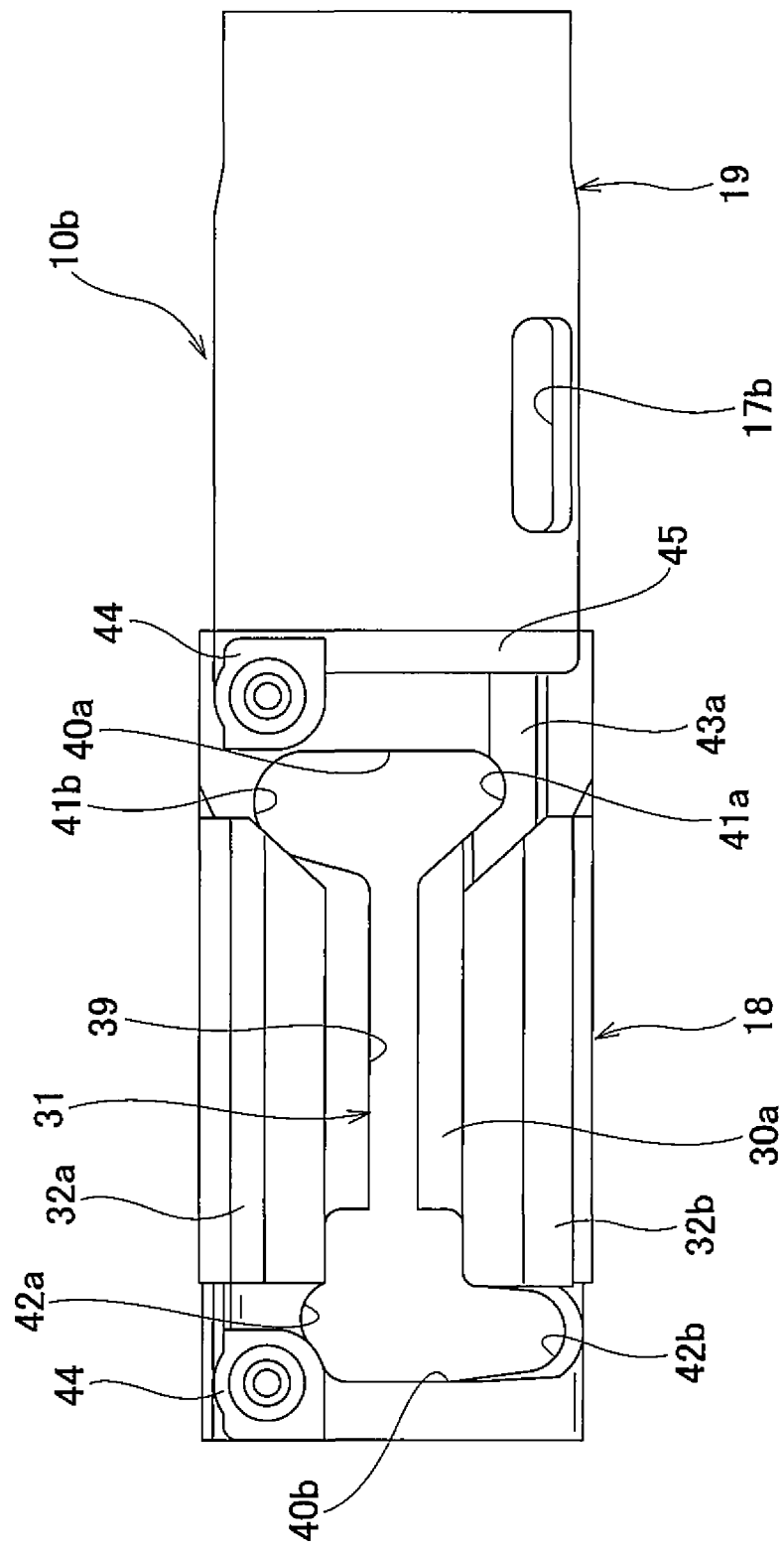
FIG. 9 is a view that corresponds to FIG. 2 for the second example.

FIG. 8 and FIG. 9 illustrate a second example of an embodiment of the present invention. In the first example of an embodiment, an L-shaped reinforcing rib 43 was formed along the contour of the closest-end section 41a in the adjacent portion of the outer-circumferential surface of the fitting-holding portion 30a that surrounds the closest-end section 41a. However, in the case of the outer column 10c of this example, a straight reinforcing rib 43a that extends in the axial direction is formed on the outer-circumferential surface of the fitting-holding portion 30a in a state so as to directly pass the closest-end section 41a in the axial direction. That is, in this example, the range where the reinforcing rib 43 is formed is larger than in the case of the first example of an embodiment. Moreover, the reinforcing rib 43a is located in a portion between the held-plate section 32b that is provided on the side in the circumferential direction that is close to the lock through hole 17b and the lock through hole 17b. The front-end section of the reinforcing rib 43a is continuous with the rear-end section of the held-plate section 32b, and the rear-end section of the reinforcing rib 43a is continuous with the thick section (rib section in the circumferential direction) 45 that is formed on the opening-edge section of the rear-end side of the main portion 18.

In this example, when compared with the first example of an embodiment, it is possible to further improve the rigidity of the portion where the closest-end section 41a is formed and the rigidity of the portions on both the front and rear sides of that portion. Therefore, it is possible to sufficiently improve the strength and rigidity of portions of the fitting-holding portion 30a that require strength and rigidity related to operation of the steering-lock apparatus 12 (see FIG. 13). As a result, even when the steering wheel 4 (see FIG. 12 and FIG. 13) is strongly rotated in a state in which the steering-lock apparatus 12 is operated, the occurrence of damage such as cracking of part of the slit 31 that is formed in the fitting-holding portion 30a is suppressed regardless of large torsional stress that is applied to the fitting-holding portion 30a. The other construction, functions and effects are the same as in the first example of an embodiment.

THIRD EXAMPLE

Figure 10:
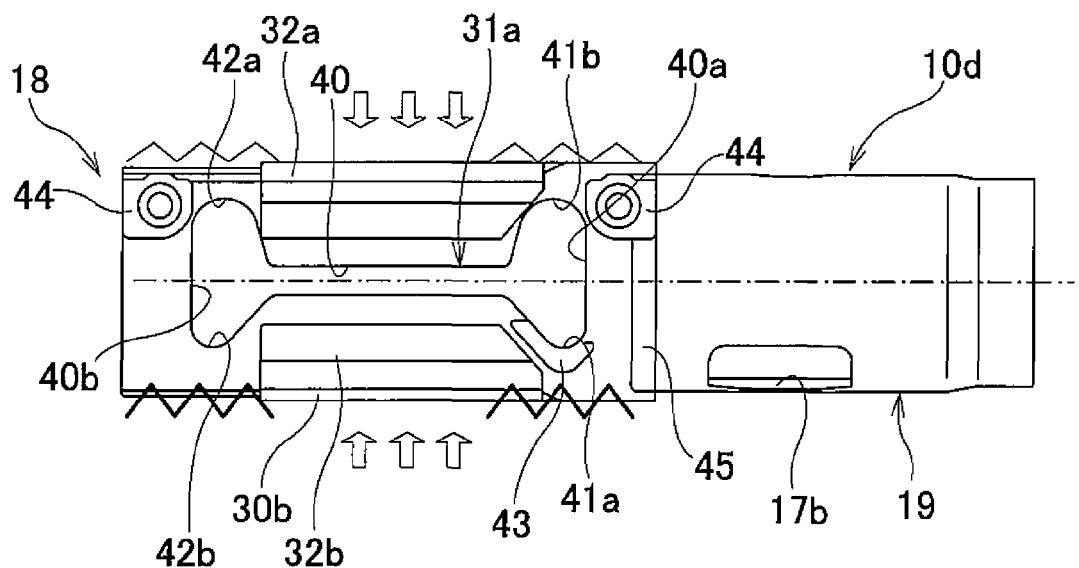
FIG. 10 is a view that corresponds to FIG. 7A illustrating a third example of an embodiment of the present invention.

FIG. 10 illustrates a third example of an embodiment of the present invention. In the first example of an embodiment, the tendency to make the rigidity high or low between the end sections of diagonal positions of the approximately H-shaped slit 31 is the same. However, in the case of the outer column 10d of this example, of the approximately H-shaped slit 31a, the tendency to make the rigidity high or low between the end sections located on the same side in the width direction (up-down direction in FIG. 10) is the same.

More specifically, as in the case of the first example of an embodiment, of the two slit-end sections 41a, 41b of the sub-slit section 40a that is located on the side in the axial direction near the lock through hole 17b, the length in the circumferential direction from the main-slit section 39 of the closest-end section 41a that exists in the portion in the circumferential direction near the lock through hole 17b is shorter than the length in the circumferential direction from the main-slit section 39 of the remaining slit-end section 41b. Moreover, of the two slit-end sections 42a, 42b of the sub-slit section 40b that is located on the side in the axial direction far from the lock through hole 17b, the length in the circumferential direction from the main-slit section 39 of the slit-end section 42 that is provided on the same side in the width direction as the closest-end section 41a, which is one slit-end section, is shorter than the length in the circumferential direction from the main-slit section 39 of the farthest-end section 42a, which is the other slit-end section. As a result, in the case of the outer column 10d of this example, the rigidity in the direction of expansion or contraction of the width of the slit 31 of the portion of the fitting-holding portion 30b where the closest-end section 41a and slit-end section 42b are formed becomes high. Moreover, a reinforcing rib 43 is formed in the portion that surrounds the closest-end section 41a. However, as in the second example of an embodiment, it is also possible to form a straight reinforcing rib 43a that extends in the axial direction in a state so as to pass the closest-end section 41a in a straight line.

In this example, it is possible to sufficiently improve the strength and rigidity of the portion of the fitting-holding portion 30b that particularly requires strength and rigidity related to the operation of the steering-lock apparatus 12 (see FIG. 13). Therefore, when the steering wheel 4 (see FIG. 12 and FIG. 13) is strongly rotated in a state in which the steering-lock apparatus 12 is operated, the occurrence of damage such as cracking of part of the slit 31a is suppressed regardless of large torsional stress that is applied to the fitting-holding portion 30b.

When the adjustment lever 38 (see FIG. 5) has been operated in order to maintain the forward-backward position of the steering wheel 4 at the adjusted position, it is possible to cause the held-plate section 32a on the top side in FIG. 10 to elastically deform a large amount, and the force for maintaining the forward-backward position of the steering wheel 4 at the adjusted position becomes sufficiently large. In this way, it is possible to maintain a certain amount of flexibility of the fitting-holding portion 30b. Moreover, of the pair of sub-slit sections 40a, 40b, the length in the circumferential direction of one of the slit-end sections 41a, 42b is shorter than the length in the circumferential direction of the other slit-end section 41b, 42a, so when the adjustment rod 37 (see FIG. 5 and FIG. 12) is displaced to the rear end section or is displaced to the front-end section of the long holes 33 in the forward-backward direction, the force required to operate the adjustment lever 38 is the same. The other construction, functions and effects are the same as in the first example of an embodiment.

FOURTH EXAMPLE

Figure 11:
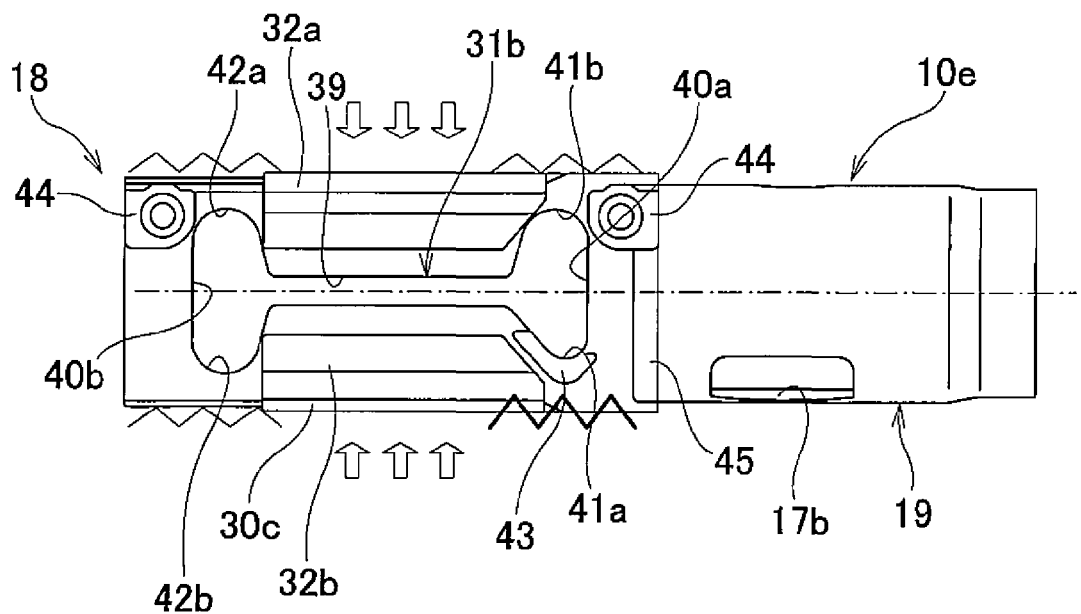
FIG. 11 is a view that corresponds to FIG. 7A illustrating a fourth example of an embodiment of the present invention.

FIG. 11 illustrates a fourth example of an embodiment of the present invention. In the case of the outer column 10e of this example, of the four slit-end sections 41a, 41b of the approximately H-shaped slit 31b, only the length in the circumferential direction from the main-slit section 39 of the closest-end section 41a that is located in the portion near the lock through hole 17b is shorter than the lengths in the circumferential direction from the main-slit section of the remaining slit-end sections 41b, 42a, 42b. Moreover, a reinforcing rib 43 is formed in the portion adjacent to the area around the closest-end section 41a. However, as in the second example of an embodiment, it is also possible to form a straight reinforcing rib 43a that extends in the axial direction in a state so as to linearly pass the closest-end section 41a in the axial direction.

In this example, it is possible to sufficiently improve the strength and rigidity of only the portions of the fitting-holding portion 30c that require strength and rigidity related to the operation of the steering-lock apparatus 12 (see FIG. 13). Therefore, when the steering wheel 4 (see FIG. 12 and FIG. 13) is strongly rotated in a state in which the steering-lock apparatus 12 is operated, the occurrence of damage such as cracking of part of the slit 31b is suppressed regardless of large torsional stress that is applied to the fitting-holding portion 30c.

Moreover, in this example, of the four slit-end sections 41a, 41b, 42a, 42b of the slit 31b, only the length in the circumferential direction from the main-slit section 39 of the closest-end section 41a that is located in the portion closest to the lock through hole 17b is shorter than the length in the circumferential direction from the main-slit section 39 of the remaining slit-end sections 41b, 42a, 42b. Therefore, it is possible to sufficiently maintain the flexibility of the fitting-holding portion 30c, and it is possible to bring the held-plate sections 32a, 32b sufficiently close to each other even without increasing the operating force that is applied to the adjustment lever 38 (see FIG. 5). The operating force of the adjustment lever 38 becomes larger when the adjustment rod 37 (see FIG. 5 and FIG. 12) is located at the rear-end section of the long holes 33 in the forward-backward direction than when located at the front-end section, however, by making the rigidity of the holding plate 35 of the vehicle-side bracket 34 that is used in combination with the outer column 10e differ in the forward-backward direction (make the rigidity at the front-end section of the holding plate 35 high, and make the rigidity at the rear-end section of the holding plate 35 low), it is possible to make the operating force of the adjustment lever 38 nearly the same when the adjustment rod 37 is located at the front-end section and when located at the rear-end section of the long holes 33 in the forward-backward direction. The other construction, functions and effects are the same as in the first example of an embodiment.

[Industrial Applicability]

The present invention can be widely applied to telescopic steering apparatuses that have a telescopic mechanism for adjusting the forward-backward position of a steering wheel regardless of whether or not there is a tilt mechanism.

[Explanation of Reference Numbers]
1 Vehicle body
2, 2a Steering column
3, 3a Steering shaft
4 Steering wheel
5a, 5b Universal joint
6 Intermediate shaft
7 Steering gear unit
8 Input shaft
9 Tie rod
10, 10a to 10e Outer column
11a Outer tube
11b Inner shaft
12 Steering-lock apparatus
13 Lock unit
14 Engaging concave section
15 Key-lock collar
16 Lock pin
17, 17a, 17b Lock through hole
18 Main portion
19 Cylindrical shaped member
20 Concave section
21 Die
22 End surface
23 Insertion hole 24 Core
25 Tip-end section
26 Base-end section
27 Stepped surface
28 Convex section
29 Inner column
30, 30a to 30c Fitting-holding portion
31, 31a, 31b Slit
32a, 32b Held-plate section
33 Long hole in the forward-backward direction
34 Vehicle-side bracket
35 Holding plate
36 Through hole
37 Adjustment rod
38 Adjustment lever
39 Main-slit section
40a, 40b Sub-slit section
41a, 41b Slit-end section (41a Closest-end section)
42a, 42b Slit-end section (42a Farthest-end section)
43, 43a Reinforcing rib
44 Installation section
45 Thick section

What is claimed is:

1. An outer column for a telescopic steering apparatus, comprising:
a slit formed in one end section in an axial direction of the outer column;
a pair of held-plate sections provided in positions on both sides of the slit in a width direction of the outer column and having long holes that extend in the axial direction and that are formed in portions of the pair of held-plate sections, the portions being aligned with each other; and
a lock through hole formed in a portion that is separated in the axial direction from the pair of held-plate sections, with a phase of the portion in a circumferential direction of the outer column being shifted from a center axis of the slit,
the slit having an approximately H shape as seen in a radial direction of the outer column, and comprising: a main-slit section formed in the axial direction; and a pair of sub-slit sections formed in the circumferential direction at both end sections in the axial direction of the main-slit section, with middle sections in the circumferential direction of the sub-slit sections being continuous with the end sections in the axial direction of the main-slit section; and
the pair of the sub-slit sections having four end sections, the four end sections each having a length in the circumferential direction from the main-slit sections, and at least the length in the circumferential direction from the main-slit section of a closest-end section of one sub-slit section of the pair of the sub-slit sections which is located on a side close to the lock through hole in the axial direction, the closest-end section being located in a portion close to the lock through hole in the circumferential direction, being shorter than the lengths in the circumferential direction from the main-slit section of the other end sections of the pair of sub-slit sections.

2. The outer column for a telescopic steering apparatus according to claim 1, wherein, in another sub-slit section of the pair of the sub-slit sections which is located on a far side from the lock through hole in the axial direction, the length in the circumferential direction from the main-slit section of one end section of the other sub-slit section is shorter than the length in the circumferential direction from the main-slit section of other end section of the other sub-slit section.

3. The outer column for a telescopic steering apparatus according to claim 2, wherein the one end section of the other sub-slit section is a farthest-end section that is located at a position diagonal to the closest-end section and that is located the farthest from the lock through hole.

4. The outer column for a telescopic steering apparatus according to claim 2, wherein the one end section of the other sub-slit section is an end section of the other sub-slit section on the side close to the lock through hole in the circumferential direction.

5. The outer column for a telescopic steering apparatus according to claim 1, wherein a reinforcing rib is provided on an outer-circumferential surface of a portion that surrounds the closest-end section.

6. The outer column for a telescopic steering apparatus according to claim 5, wherein the reinforcing rib is provided to linearly pass the closest-end section in the axial direction.

7. The outer column for a telescopic steering apparatus according to claim 1, wherein the outer column comprises: a main portion made of a light metal alloy and having an end section; and a cylindrical shaped member made of an iron-based material and having a middle section in the axial direction and an end section, an inner diameter dimension being less than that of the middle section in the axial direction,
wherein the outer column is constructed by joining together the main portion and the cylindrical shaped member in the axial direction by fitting and fastening the end section of the cylindrical shaped member inside the end section of the main portion,
wherein the slit and the pair of held-plate sections are provided on the main portion, and the lock through hole is provided on the cylindrical shaped member.

* * * * *